US009256566B1

(12) United States Patent
Dykes et al.

(10) Patent No.: US 9,256,566 B1
(45) Date of Patent: Feb. 9, 2016

(54) MANAGED RELIABILITY OF DATA STORAGE

(71) Applicant: Seagate Technology LLC, Cupertino, CA (US)

(72) Inventors: James Dykes, Longmont, CO (US); Edward Jen-Yu Chen, Boulder, CO (US); Peter Viscarola, Mount Vernon, NH (US); Scott Noone, Amherst, NH (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/803,007

(22) Filed: Mar. 14, 2013

Related U.S. Application Data

(60) Provisional application No. 61/756,388, filed on Jan. 24, 2013.

(51) Int. Cl.
*G06F 13/40* (2006.01)
(52) U.S. Cl.
CPC .................................. *G06F 13/4068* (2013.01)
(58) Field of Classification Search
CPC . G06F 11/2069; G06F 11/2071; G06F 13/14; G06F 13/20; G06F 13/4081; G06F 9/455; G06F 9/5077; G06F 13/4068; G06F 13/385; G06F 9/4411; G06F 13/387; G06F 13/4086; H04L 49/357
USPC .................................................. 710/8, 16, 17
See application file for complete search history.

(56) References Cited

U.S. PATENT DOCUMENTS

| 5,625,777 | A  |   | 4/1997  | Takahashi |
|-----------|----|---|---------|-----------|
| 6,049,528 | A  | * | 4/2000  | Hendel et al. ................. 370/235 |
| 6,230,246 | B1 | * | 5/2001  | Lee et al. ...................... 711/167 |
| 6,665,763 | B1 |   | 12/2003 | Burns |
| 6,760,804 | B1 |   | 7/2004  | Hunt et al. |
| 6,810,432 | B1 | * | 10/2004 | Hanes et al. ..................... 710/4 |
| 6,889,281 | B2 |   | 5/2005  | Burns |
| 7,000,042 | B1 |   | 2/2006  | Burns |
| 7,277,987 | B2 |   | 10/2007 | Sato |
| 7,350,046 | B2 |   | 3/2008  | Sicola |
| 7,644,218 | B2 |   | 1/2010  | Deng |

(Continued)

OTHER PUBLICATIONS

Dykes, Managed Reliability of Data Storage, Application No. 13803003, Filing Date:Mar. 14, 2013, 41 pages.

(Continued)

*Primary Examiner* — Farley Abad
(74) *Attorney, Agent, or Firm* — Cesari & Reed LLP; Kirk A. Cesari

(57) ABSTRACT

Systems and methods are provided herein that can facilitate the managed reliability of data storage, including management of device remanufacturing and masking from an operating system a failure or predicted failure of a device running on a computer or a networked cluster of computers having access to the device. The systems and methods may facilitate removal of a device by coordinating among computers or controllers in a network cluster the logical removal of a device. At a later time, a coordinated logical re-introduction of the device to the systems or computers from which the device was logically removed can be performed. This can be accomplished via a virtualization system that may include a device function driver (DFD), a device virtualization bus driver (DVBD), and a device management service (DMS).

19 Claims, 11 Drawing Sheets

(56) References Cited

U.S. PATENT DOCUMENTS

| | | |
|---|---|---|
| 7,716,277 B2 | 5/2010 | Yamatake |
| 7,822,917 B2 | 10/2010 | Lodolo |
| 8,140,914 B2 | 3/2012 | Murphy |
| 8,181,159 B2 | 5/2012 | Khalil |
| 8,225,135 B2 | 7/2012 | Barrall |
| 8,276,043 B2 | 9/2012 | Yano |
| 8,332,362 B2 | 12/2012 | McGovern |
| 8,583,869 B2 | 11/2013 | Hinkle |
| 8,656,072 B2 | 2/2014 | Hinkle |
| 8,787,256 B2 | 7/2014 | Rabinovich |
| 8,838,891 B2 | 9/2014 | Bert |
| 8,850,108 B1 | 9/2014 | Hayes |
| 8,868,825 B1 | 10/2014 | Hayes |
| 2002/0069245 A1 | 6/2002 | Kim |
| 2003/0154340 A1 | 8/2003 | Bolt |
| 2004/0019710 A1 | 1/2004 | Kolli |
| 2004/0172636 A1 | 9/2004 | Do et al. |
| 2005/0165998 A1 | 7/2005 | Bolt |
| 2006/0206643 A1 | 9/2006 | Tran |
| 2007/0143316 A1 | 6/2007 | Chen et al. |
| 2007/0214313 A1 | 9/2007 | Kalos |
| 2007/0276966 A1* | 11/2007 | Paul et al. ............ 710/8 |
| 2008/0010557 A1 | 1/2008 | Kume |
| 2008/0320501 A1 | 12/2008 | Li et al. |
| 2009/0132737 A1* | 5/2009 | Huang et al. ............ 710/62 |
| 2009/0282194 A1 | 11/2009 | Nagashima |
| 2009/0327632 A1 | 12/2009 | Glaizel et al. |
| 2012/0059970 A1 | 3/2012 | Hinkle |
| 2012/0166582 A1 | 6/2012 | Binder |
| 2012/0323977 A1 | 12/2012 | Fortier |
| 2012/0324178 A1 | 12/2012 | Yoon |
| 2013/0029652 A1 | 1/2013 | Nakrani |
| 2014/0052925 A1 | 2/2014 | Kotzur |
| 2014/0195633 A1 | 7/2014 | Carter |

OTHER PUBLICATIONS

Dykes, Managed Reliability of Data Storage, Application No. 13803011, Filing Date:Mar. 14, 2013, 38 pages.

* cited by examiner

MANAGED RELIABILITY OF DATA STORAGE

BACKGROUND

This application relates to systems, devices, and methods for managed reliability of data storage devices and systems.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

In some embodiments, the systems and methods may facilitate the managed reliability of data storage, including management of device remanufacturing and masking from an operating system a failure or predicted failure of a device running on a computer or a networked cluster of computers having access to the device. If there are indications that a device is failing or about to fail, the systems may respond to operating system requests for the health status of the device by returning an indication that no failure is predicted. If deemed appropriate, the device may be taken offline functionally for servicing without interrupting the operating system, or without having to power down the computer or networked cluster of computers having access to the device.

In other embodiments, the systems and methods may facilitate removal of a device by coordinating among computers or controllers in a network cluster the logical removal of a device, such as for remanufacturing. At a later time, such as when remanufacturing is complete, the system may coordinate the logical re-introduction of the device to the systems or computers from which the device was logically removed. Further, once a device has been logically removed from a system, it could also be physically removed if desired.

In some embodiments, the systems and methods for managed reliability of data storage can include a device function driver (DFD), a device virtualization bus driver (DVBD), and a device management service (DMS) for facilitating the management of devices in a system. Detailed embodiments and variations of systems and methods utilizing a DFD, DVBD, and a DMS are described below with respect to FIGS. 1 through 13.

Figure 1:
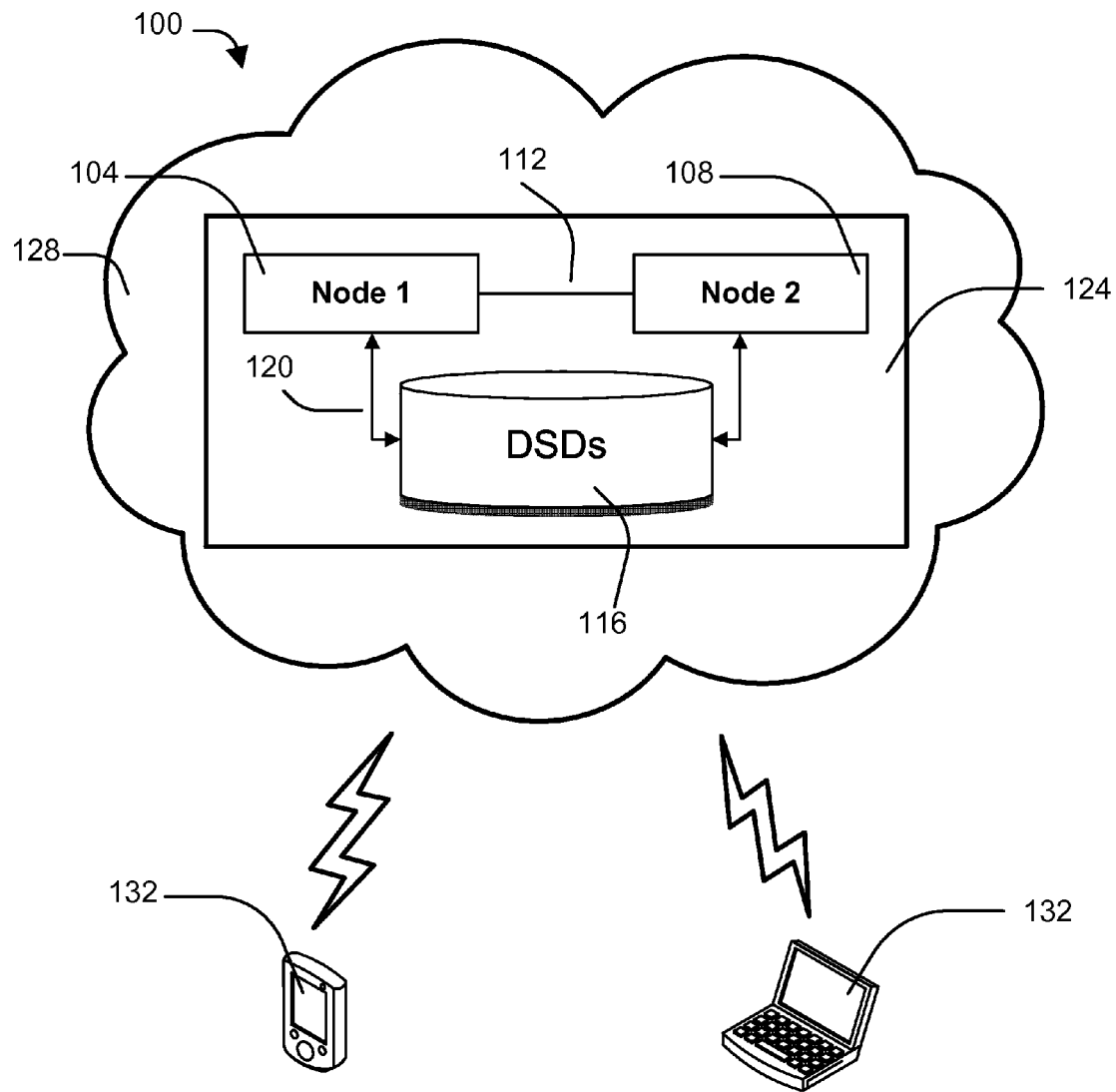
FIG. 1 shows a diagram of an illustrative embodiment of a system for managed reliability of data storage.
Figure 2:
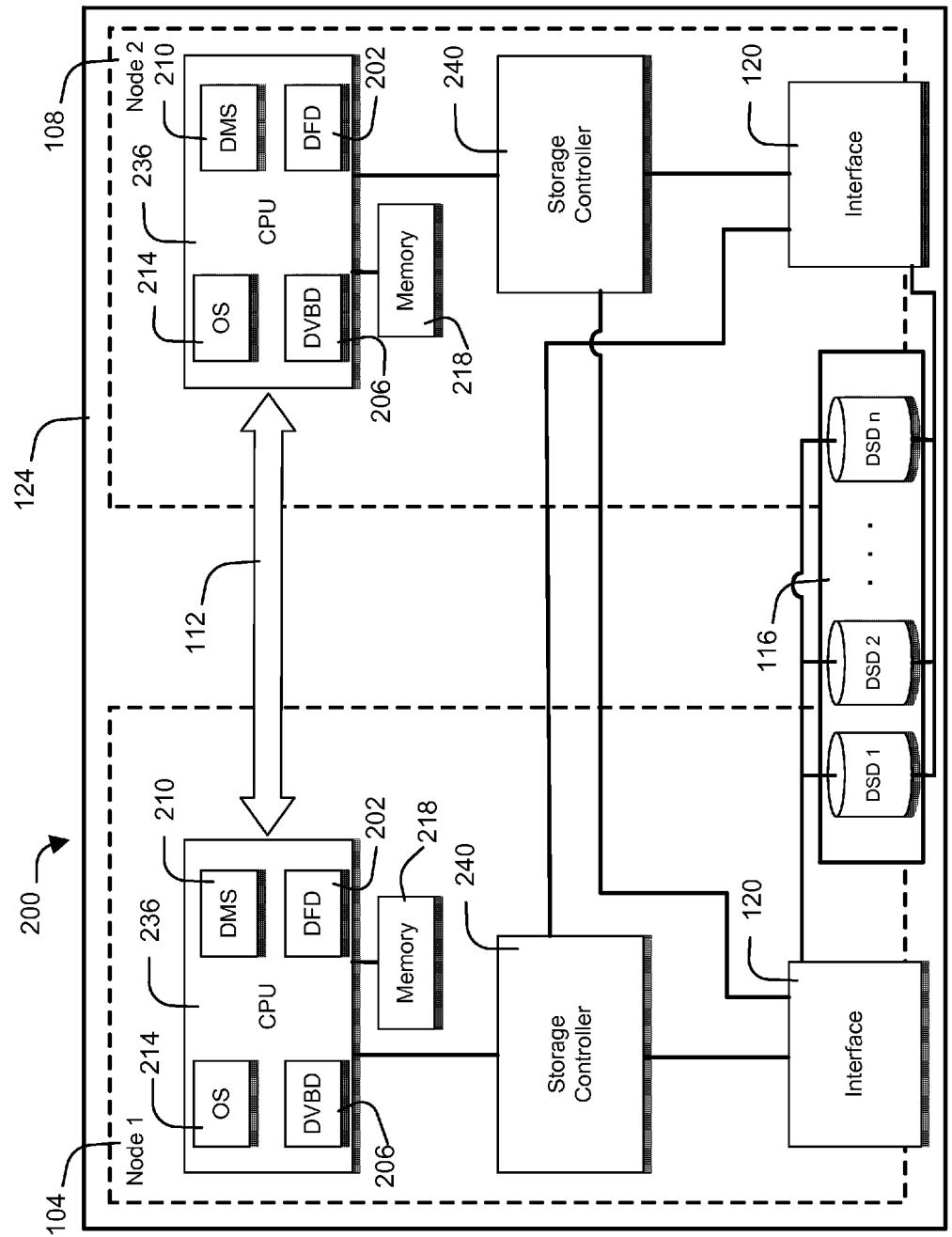
FIG. 2 shows a diagram of another illustrative embodiment of a system for managed reliability of data storage.

FIGS. 1 and 2 each show a diagram of an illustrative embodiment of an environment in which aspects of a system for managed reliability may be implemented, generally designated 100 and 200, respectively. In some embodiments, the environments 100, 200 may comprise a plurality of nodes 104, 108 that form a networked cluster. The nodes 104, 108 may communicate with each other via a network connection 112. For example, the network connection 112 may be a multiple Gigabit Ethernet connection.

Each node 104, 108 may be a computing device connectable to a network or to another computing device. The computing device could be a server, a desktop computer, a laptop computer, a tablet computer, a phone, another electronic device, a communications device, any other structure having a processing capability, or any combination thereof. Each node 104, 108 may have a unique network address, such as a Data Link Control (DLC) address or a Media Access Control (MAC) address.

In some embodiments, each node 104, 108 may comprise a server having at least one computer processor 236 as well as a computer memory 218 that can include volatile random access memory ('RAM') and some form of non-volatile computer memory. The computer memory could include electrically erasable programmable read-only memory (also known as 'EEPROM'), volatile solid state memory (such as Dynamic Random Access Memory, also known as "DRAM"), non-volatile solid state memory (such as 'Flash' memory), a hard disk drive, an optical disk drive, or any combination thereof. The computer memory 218 may be connected through a system bus to the processor 236 and to other system components, such as a storage controller 240.

Each node 104, 108 may further comprise an operating system (OS) 214, a device function driver (DFD) 202, a device virtualization bus driver (DVBD) 206, and a device management service (DMS) 210. The OS 214, DFD 202, DVBD 206, and DMS 210 may comprise computer program instructions stored in computer memory 218 and processed by central processing unit (CPU) 236 to perform the methods and functions described in embodiments herein.

The environments 100, 200 may further comprise an array of data storage devices (DSDs) 116. The DSDs 116 may include any device that can transmit or receive data over an interface 120. For example, one or more of the DSDs 116 may be any device capable of data storage, such as a hard drive or any other data storage device. The array of DSDs 116 may be various types and varied capacities of data storage devices, or the DSDs 116 could include data storage devices that are all of the same type and storage capacity.

Each of the DSDs 116 may be connected to one or more nodes 104, 108. The nodes 104, 108 may share read access, write access, or any combination thereof to one or more of the DSDs 116. For example, in some embodiments, the array of DSDs 116 may comprise 24 data storage devices. Any combination of the DSDs 116 may be read from or written to by any combination of the nodes 104, 108 via an interface 120. Stated another way, the nodes 104, 108 may transmit data to or receive data from one or more of the DSDs 116 across the interface 120. The interface 120 may transfer data between the nodes 104, 108 and the DSDs 116.

The interface 120 can be any type of interface 120 capable of transmitting data between devices. The interface 120 may be in the form of a computer bus interface standard or other interface protocol for transferring data between systems or components, such as USB 2.0, USB 3.0, IEEE 1394, SATA, SAS, Fiber Channel, or Ethernet. Other embodiments of the interface 120 may include wireless interfaces, such as IEEE 802.11 protocols, Bluetooth, infrared, cellular, or satellite mobile telecommunication protocols. Hardware necessary to implement the interface 120 may be added to the nodes 104, 108 and the DSDs 116.

In one or more embodiments, the interface 120 may comprise a bridged interface (not shown) between the nodes 104, 108 and the DSDs 116. The bridged interface may comprise a node interface (not shown), an interface bridge (not shown), and a device interface (not shown). The nodes 104, 108 may transmit data to or receive data from the DSDs 116 across the bridged interface.

In a particular embodiment, data may be transferred between the nodes 104, 108 and the DSDs 116 by way of the node interface, the interface bridge, and the device interface. The node interface and the device interface can represent any means of transmitting data between devices. The node interface and the device interface may be a computer bus interface standard or other interface protocol for transferring data between systems or components, such as USB 2.0, USB 3.0, IEEE 1394, Compact Flash, SATA, eSATA, PATA, SCSI, SAS, Fiber Channel, PS/2, serial cable, HDMI, or Ethernet. Other embodiments of the interfaces may include wireless interfaces 408, 416, such as IEEE 802.11 protocols, Bluetooth, infrared, cellular, or satellite mobile telecommunication protocols. Hardware necessary to implement the node interface or the device interface may be added to the nodes 104, 108 and the DSDs 116.

The interface bridge may comprise any method of connecting the node interface and the device interface, such as a male-to-male adapter; an interface protocol adapter such as USB-to-SATA, a device such as a server, a router, a personal computer, a drive capable of integration into a daisy-chain network arrangement; or any type of network. The interface bridge may function as a wireless-to-wired interface protocol adapter, so that one of the node interface or the device interface may be a wired interface protocol, and the other may be a wireless interface protocol.

A storage controller 240 may be able to communicate with any or all of the DSDs 116 via an interface 120 and may handle the movement of data as well as other functions such as RAID. Moreover, the storage controller 240 of a first node 104 may be capable of managing the movement of data with respect to any or all of the DSDs 116 via the interface 120 of a second node 108, and vice-versa.

In some embodiments, each of the DSDs 116 may only have one node 104, 108 serving as the DSD's 116 management owner at any given time. The management owner may be responsible for monitoring the health of the DSD 116, and for initiating remanufacturing if the DSD's 116 health is degraded.

In one particular embodiment, the nodes 104, 108 and the array of DSDs 116 may be disposed within a single, shared enclosure 124. One or more other devices 132 may have access to the nodes 104, 108 via a network connection 128. Devices 132 may not know to which node 104 or 108 it is connecting at any given time. Nodes 104 and 108 can be formed as a cluster and node 104 can be a backup for node 108, and vise-versa. Each device 132 may be a computer, such as a server, a desktop computer, a laptop computer, a tablet computer, another electronic device, a communications device, or the like, or any combination thereof.

Figure 3:
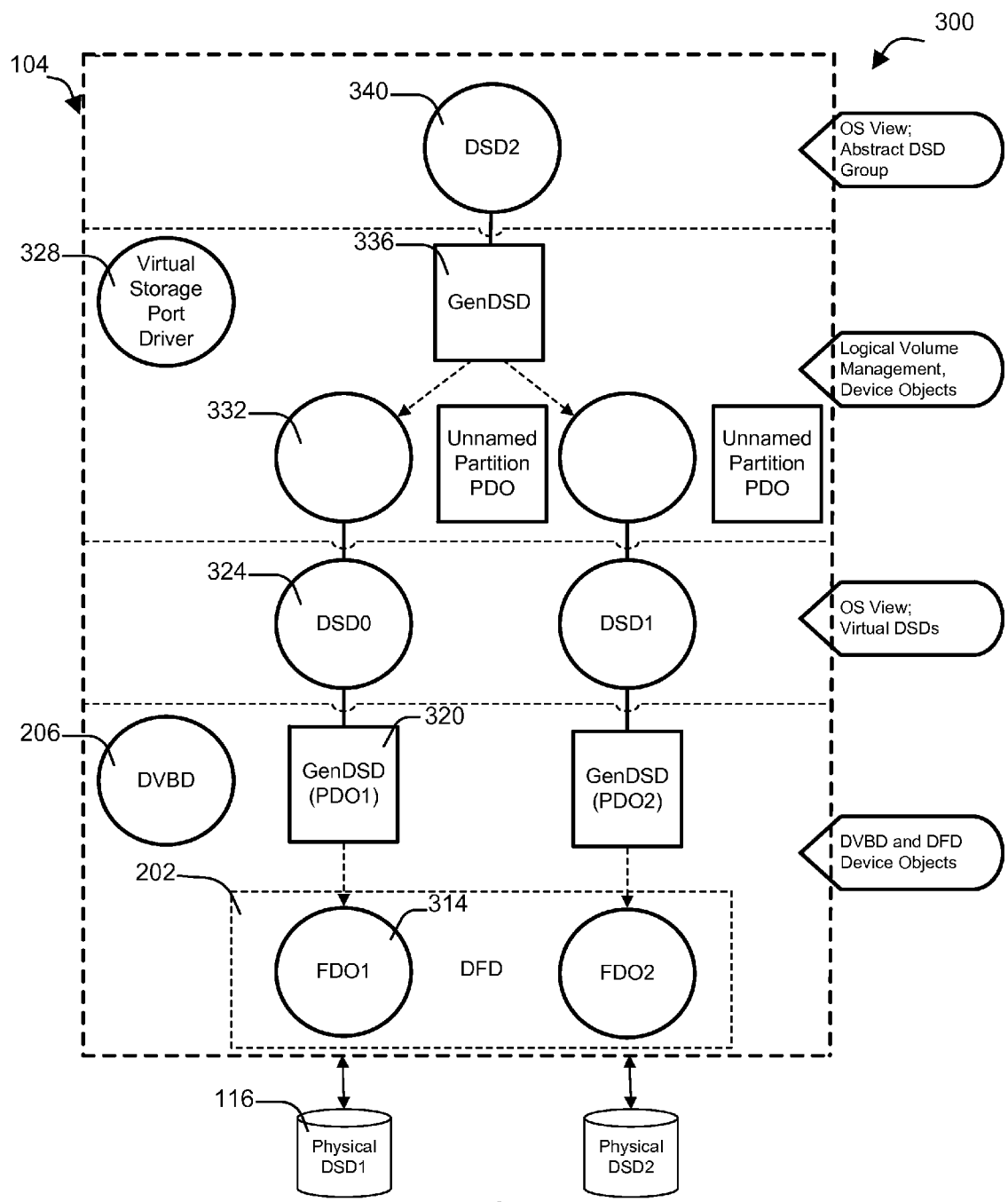
FIG. 3 shows a diagram of an illustrative embodiment of virtualization system device objects that can be used for managed reliability of data storage.
Figure 4:
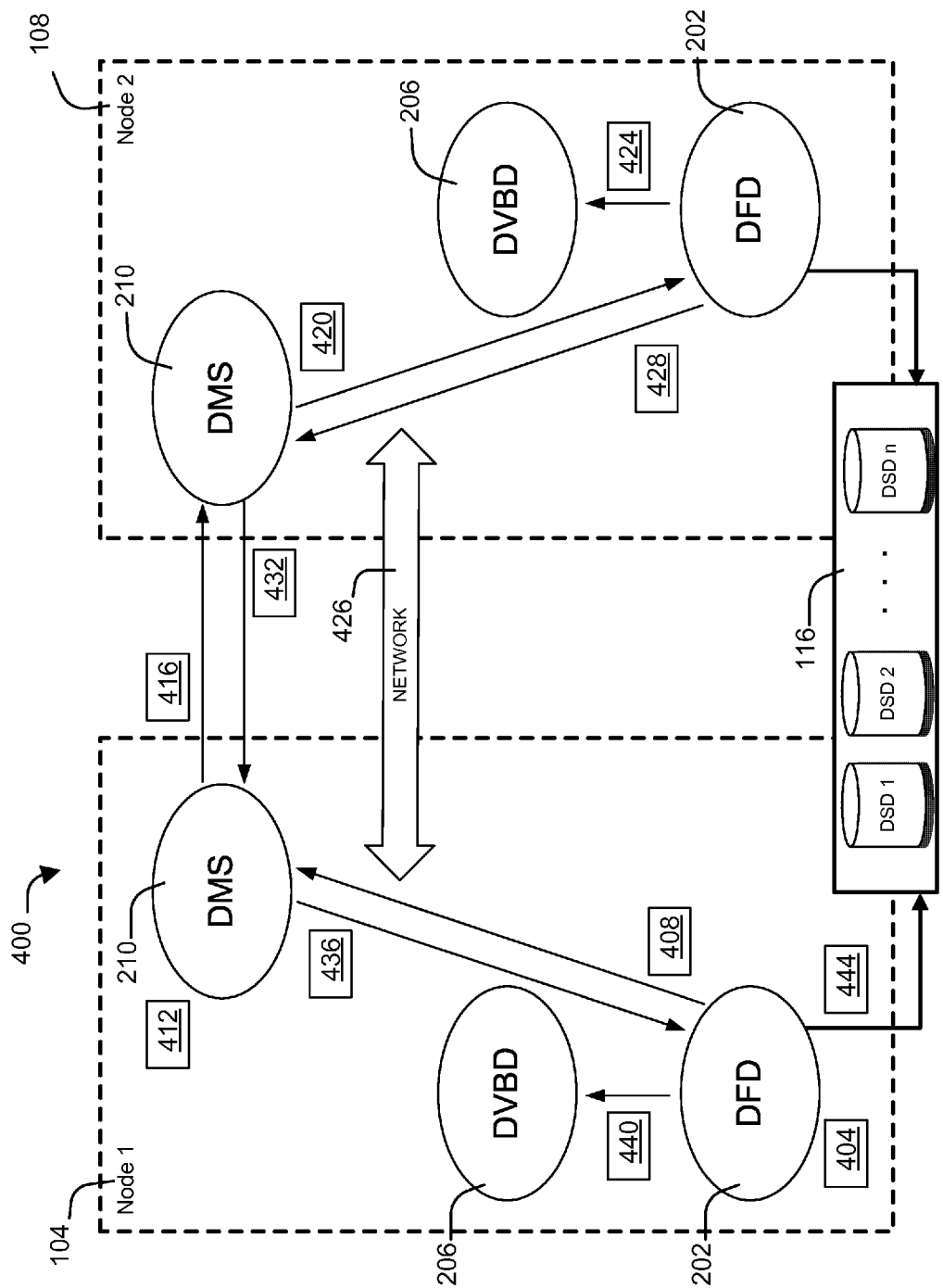
FIG. 4 shows a diagram of an illustrative embodiment of virtualization system communications that can be used for managed reliability of data storage.

FIGS. 3 and 4 will be discussed in conjunction. FIG. 3 shows a diagram of an illustrative embodiment of virtualization system device objects that can be used for managed reliability of data storage, generally designated 300. FIG. 4 shows a diagram of an illustrative embodiment of virtualization system communications that can be used for managed reliability of data storage, generally designated 400.

The virtualization system 400 may comprise a device function driver (DFD) 202, a device virtualization bus driver (DVBD) 206, and a device management service (DMS) 210. In various embodiments, the DFD 202, DVBD 206, and DMS 210 may be software modules comprising computer program code. Referring also to FIG. 2, computer program code for the software modules of some embodiments may reside in the node 104, storage controller 240 and in the DSDs 116. Various functions in implementing embodiments of the virtualization system 400 may be resident in different portions of the environment 200 or may be downloaded to various components as needed. Such downloading may comprise reading computer program code from memory of a storage controller 240 or DSD 116, storing the computer program code, and executing the computer program code.

The DFD 202 may be designed for use with a specific operating system 214. When one or more of the DSDs 116 is connected to a first node 104 via an interface 120, the hardware discovery process (e.g., a process implemented by a system configured in accordance with the Plug and Play standard) may cause the DFD 202 to be loaded. In some embodiments, the DFD 202 may be loaded in response to the DSD(s) 116 being physically connected to the node 104 and enumerated with a hardware ID. The DFD 202 may create a functional device object (FDO) 314 on each physical device object (PDO) (not shown) representing a physical DSD 116.

When the current node (first node 104) is the management owner of one or more of the DSDs 116, the DFD 202 may be responsible for monitoring the health of the DSD and managing remanufacturing operations on the DSD if deemed necessary.

The DFD 202 may also be responsible for "spoofing" the DSD's storage capacity to implement trivial overprovisioning. Overprovisioning is the practice of providing more storage capacity in the physical DSD than is visible to the operating system 214, so that limited amounts of remanufacturing do not result in a loss net storage capacity. Trivial overprovisioning is overprovisioning implemented on a per-DSD basis by hiding a pre-defined percentage of a DSD's storage capacity from the operating system 214. For example, an implementation of trivial overprovisioning of 25% means that a DSD with an initial storage capacity of 100 GB would be reported to the operating system 214 by the DFD 202 as having a storage capacity of 75 GB.

The DVBD 206 may be a root enumerated bus driver that communicates with the DFD 202 and creates a physical device object (PDO) 320 for each FDO 314 created by the DFD 202. The PDO 320 may represent a virtual DSD 324 to the operating system. Each virtual DSD 324 may be reported to the operating system as a generic DSD type 320 and may be subsequently controlled by the operating system's corresponding DSD class driver. The DVBD 206 may be responsible for deleting the PDO 320 representing the virtual DSD 324 when the associated physical DSD undergoes remanufacturing. Similarly, when remanufacturing is complete, the DVBD 206 may be responsible for re-creating the PDO 320 representing the virtual DSD 324 to the operating system 214.

The DMS 210 may be a user-mode service that is responsible for tracking how physical DSDs 116 and their corresponding virtual DSDs 324 are configured into one or more abstract DSD groups 340 via the operating system's 214 logical volume manager (LVM). The DMS 210 may be responsible for logically removing individual virtual DSDs 324 from the abstract DSD group(s) 340 before the corresponding physical DSDs 116 undergo remanufacturing. Each virtual DSD 324 may be represented by one or more unnamed partition PDOs 332 comprising a resource pool 336 at the LVM. A virtual storage port driver 328 may allow for selection of one or more of the unnamed partition PDOs 332 from the resource pool 336 to be grouped into an abstract DSD group 340. Thus, an abstract DSD group 340 may be one or more virtual DSDs 324 (and therefore one or more physical DSDs 116) represented as a single virtual DSD to a user or administrator of the OS 214.

The DMS 210 may communicate with the DFD 202 to gather information and learn when a DSD owned by the current node (first node 104) will undergo remanufacturing. The DMS 210 of a management owner first node 104 may further communicate with the DMS 210 of a non-management owner second node 108 (and any other nodes) in a cluster to inform the second node 108 of the intention to remanufacture the DSD or to inform the second node 108 of the completion of remanufacturing operations on the DSD. Similarly, the DMS 210 of a non-management owner first node 104 may communicate with the DMS 210 of a management owner second node 108 such that the non-management owner first node 104 may become aware of the intention to remanufacture the DSD or become aware of the completion of remanufacturing operations on the DSD.

In a particular embodiment, the DFD 202 of the first node 104 may determine that one of the DSDs 116 requires remanufacturing, at 404. Determining whether the DSD requires remanufacturing may be based on certain characteristics exhibited by the DSD indicating that the DSD is either failing or predicted to fail.

The DFD 202 of the first node 104 may communicate its intent to remanufacture the DSD to the DMS 210 of the first node 104, at 408. Communication between the DFD 202 of the first node 104 and the DMS 210 of the first node 104 may be carried out using an input and output control (IOCTL) interface. In some embodiments, the IOCTL interface may allow the DMS 210 to send a control message. The control message may include a control code representing an operation for the DFD 202 to perform. For example, the DMS 210 may send a control message asking the DFD 202 to return information about the corresponding DSD.

In response to being informed of the DFD's 202 intent to remanufacture the DSD, the DMS 210 of the first node 104 may logically remove the DSD from its abstract DSD group 340, at 412. The DMS 210 of the first node 104 may further broadcast the intent to remove the DSD to the DMS 210 of the second node 108, at 416. The second node 108 may be using the DSD as a non-management owner in its abstract DSD group 340. Although the illustrative embodiment shown by FIG. 4 is described herein as comprising two nodes (first node 104 and second node 108), other embodiments may comprise a cluster having more than two nodes. The various nodes and their respective DMS 210 may communicate with each other via a network connection 426.

The DMS 210 of the second node 108, upon being informed of the intent to remanufacture the DSD, may in turn inform the DFD 202 of the second node 108 of the intent to remanufacture the DSD. It is to be understood that, although communication among the DFD 202, DVBD 206, DMS 210, DSD(s) 116, OS 214, and software applications or modules of computer program code may be described herein as certain information provided by the sender to the recipient, the communication may include any type of information that would achieve the desired outcome. For example, by relaying via various interfaces the intent to remanufacture the DSD, the desired outcome is for appropriate measures to be taken to prepare for the remanufacturing. Therefore, this series of communication may comprise, for example, a request for the DFD 202 of the second node 108 to disable its device interface with the DVBD 206 of the second node 108.

The DFD 202 of the second node 108 may notify the DVBD 206 of the second node 108 of the interface departure, at 624. In response, the DVBD 206 of the second node 108 may remove the PDO 320 representing the virtual DSD 324 associated with the physical DSD, thereby logically removing the virtual DSD 324.

The DFD 202 of the second node 108 may communicate with the DMS 210 of the second node 108 to indicate success of the logical removal of the DSD, at 428. The DMS 210 of the second node 108 use one or more application programming interfaces (APIs) to logically remove the virtual DSD 320 from its abstract DSD group 340.

The DMS 210 of the second node 108 may communicate with the DMS 210 of the first node 104 to indicate successful removal of the DSD from the second node 108, at 432. Upon receiving this information from the DMS 210 of the second node 108, the DMS 210 of the first node 104 may relay to the DFD 202 of the first node 104 of an indication that the DFD 202 may thereafter properly cause the virtual DSD 320 to be logically removed from the first node 104. The DFD 202 of the first node 104 may disable the device interface with the DVBD 206. The DFD 202 of the first node 104 notifies the DVBD 206 of the first node 104 of the interface departure, at 440. In response, the DVBD 206 of the first node 104 may logically remove the PDO 320 representing the virtual DSD 324 associated with the physical DSD.

The DFD 202 may then initiate remanufacturing operations on the DSD, at 444. The DFD 202 may enable its interface with the DVBD 206 when remanufacturing is complete, thereby commencing a reversal of the actions described above in order to logically re-introduce the virtual DSD 324 to the abstract DSD group 340 of the first node 104 and the abstract DSD group 340 of the second node 108.

Figure 5:
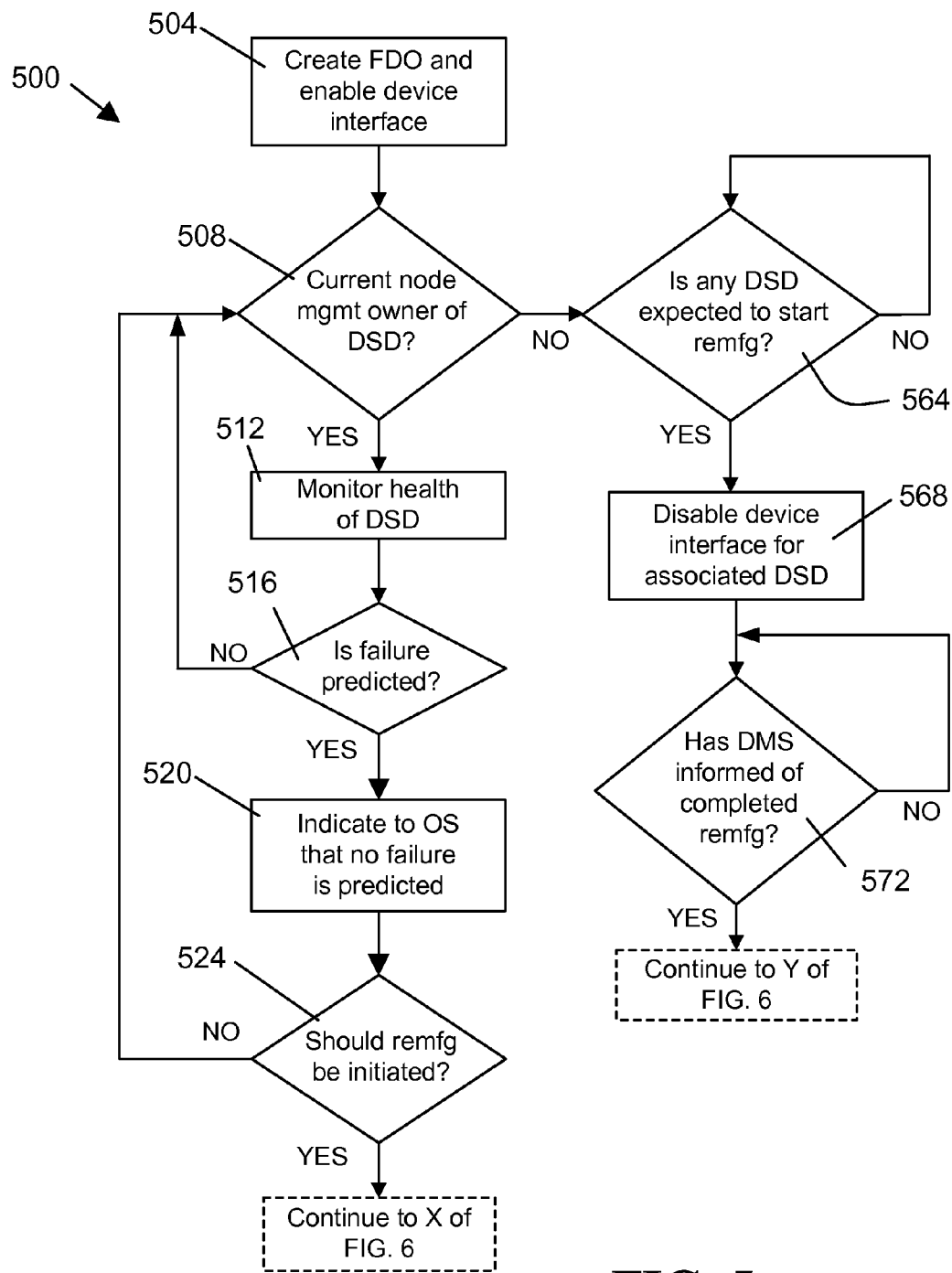
FIG. 5 and FIG. 6 show a flowchart of an illustrative embodiment of a method for managed reliability of data storage.
Figure 6:
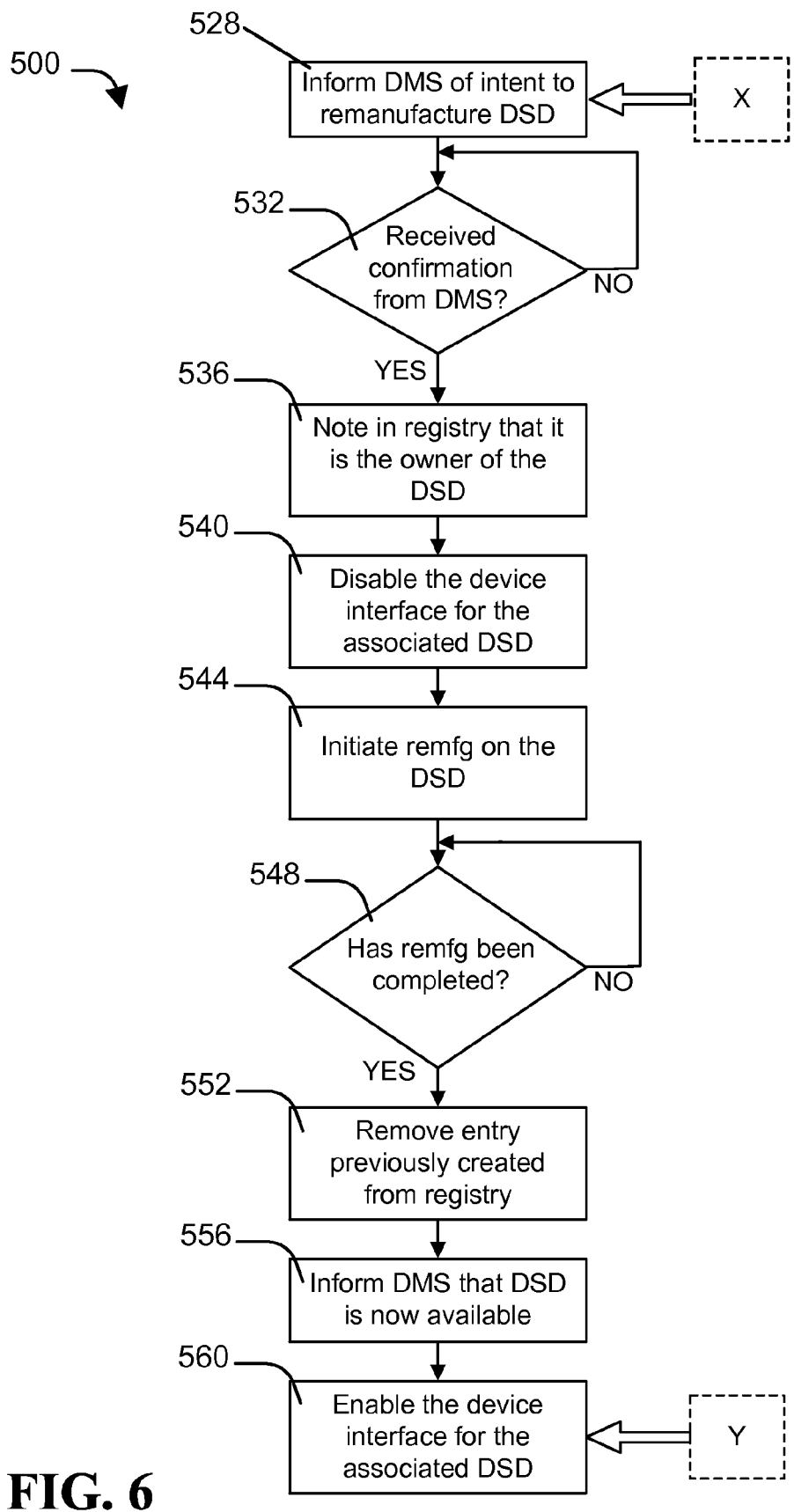

FIGS. 5 and 6 show a flowchart of an illustrative embodiment of a method for managed reliability of data storage, generally designated 500. The flowchart represents steps performed by a loaded device function driver (DFD) in accordance with some embodiments.

Nodes and interfaces between a node and a DSD have been described above with reference to FIGS. 1-4. In some embodiments, one or more of the data storage devices (DSDs) 116 may be connected to a node 104 via an interface 120. A storage port miniport driver (not shown) and/or a storage port driver (not shown) may enumerate the DSD with a certain manufacturer hardware ID via an operating system 214 hardware discovery, or Plug and Play, process. The DFD 202 may be loaded via the operating system 214 hardware discovery process in response to a storage port miniport driver and/or a storage port driver enumerating the DSD and in response to the port driver creating a physical device object (PDO) (not shown) representing the physical DSD.

Figure 10:
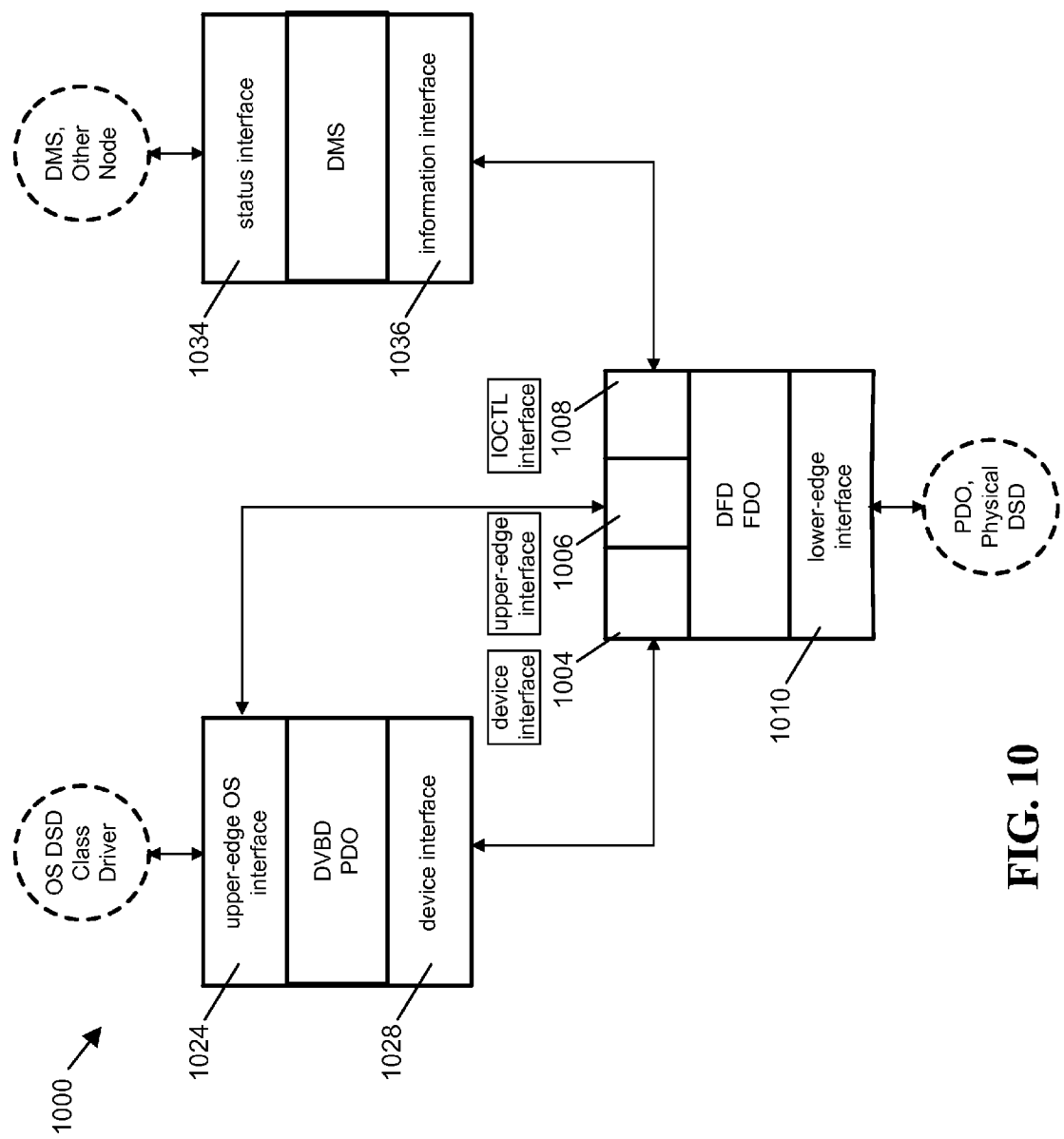
FIG. 10 shows a diagram of an illustrative embodiment of a system and method for managed reliability of data storage.

The DFD 202 may create a functional device object (FDO) 314 for each port driver-reported PDO having a certain hardware ID, at 504. Referring also to FIG. 10, the DFD 202 may register and enable a device interface 1004 for each FDO 314 that it creates. The device interface 1004 may be used to notify the device virtualization bus driver (DVBD) 206 of the arrival of a new DSD. The device interface 1004 may also be used to inform the DVBD 206 that a DSD is pending the initiation of remanufacturing or has completed remanufacturing. To inform the DVBD 206 that a DSD is intended to be remanufactured, the DFD 202 may disable the device interface 1004. Conversely, the DFD 202 may inform the DVBD 206 that a DSD has completed remanufacturing by enabling the device interface 1004.

In some embodiments, the method 500 may further involve the DFD 202 deciding whether the current node 104 is the management owner of the DSD, at 508. The DFD 202 may make this management owner determination for each FDO 314 created. Each DSD may only have one node 104 serving as the DSD's management owner at any given time.

To determine whether the current node 104 is the management owner of the DSD, the DFD 202 may intercept the completion status of periodic persistent reserve out operations (hereinafter referred to as "reserve request") sent by operating system 214 software to the each DSD that is under the current node's 104 control. Management ownership status be acquired by a node 104 based on the first success-indicating response (i.e., a successful reserve request) intercepted by the DFD 202. Ownership of the DSD may change, and the DFD 202 may track the results of subsequent reserve requests. In some embodiments, any time a reserve request is successful, the current node 104 may become management owner of the DSD 116 to which the reserve request was directed.

The DFD 202 may further provide a standard upper-edge device input and output control (IOCTL) interface 1006 used to receive input and output (I/O) operations destined to a DSD. The DVBD 206 may use this interface 1006 to forward to the DFD 202 I/O operations (via IOCTL messages) from the operating system's 214 corresponding device class driver(s). In turn, the DFD 202 may provide a lower-edge IOCTL interface 1010 to forward to the underlying PDO (representing the physical DSD) certain I/O operations the DFD 202 receives from the DVBD 206.

If the current node 104 is determined to be the management owner of the DSD, then the DFD 202 may monitor the health of the DSD, at 512. The management owner of the DSD may also be responsible for ensuring that the operating system 214 only perceives the DSD as healthy. By intercepting the results of health status-inquiring IOCTL requests periodically sent by the operating system's 214 corresponding device class driver(s) to the underlying storage port miniport driver and/or the storage port driver, the DFD 202 may determine whether failure is predicted, at 516. For example, the device class driver(s) may periodically send an IOCTL request message to the underlying storage port miniport driver and/or the storage port driver inquiring whether the DSD is predicted to fail.

The DFD 202 may acquire and monitor one or more DSD parameters. DSD 202 parameters may be acquired in a periodic or continuous manner. Monitoring of parameters may include comparison with optimal usage models or other device parameters and thresholds and may include calculation of rates, trends and other representations of system and component activity and condition. Monitoring may employ elements of Self Monitoring and Reporting Technology (SMART). SMART is an industry-adopted standardized specification for failure warnings, which are based on monitoring for excessive internal drive errors, such as bit-read errors and track-seek errors. SMART employs a failure-warning algorithm running in a processor that checks whether error rates exceed a threshold value and if such condition exists, a warning is sent to the node's 104 CPU 236. While SMART is a reactive approach to possible drive failure, aspects of SMART may be employed in connection with parameters acquired as part of the monitoring the health of the DSD.

In some embodiments, the acquired DSD parameters may comprise at least one parameter selected from the following group: bit error rate, number of uncorrectable errors, number of grown-in errors, number of bad sectors, number of spare sectors used, number of failed reads, temperature, humidity, other environmental conditions, amplitude of a read signal, quality of a read signal, percent of total capacity used, number of reads, and number of writes. However, any parameter suitable evaluating the health of the DSD may be acquired. The parameter(s) may be monitored per sector, track, zone, or DSD, or any combination thereof.

A current health state value may be calculated based on the acquired DSD parameter(s). The current health state value may be compared to a failure-indicating state value representing a threshold value above which the DSD is predicted to fail. Calculation of the failure-indicating state value may also be based on the acquired DSD parameter(s). The failure-indicating state value may be predetermined, or it may be determined on-the-fly. In one particular embodiment, the current health state value may be compared with the failure-indicating state value. Failure may be predicted if the current health state value exceeds the failure-indicating state value.

If failure is predicted and the current node 104 is management owner of the DSD, then the DFD 202 may note the predicted failure but return to the operating system 214 an indication that no failure is predicted, at 520, thereby ensuring that the operating system 214 only sees the DSD as healthy. In some examples the DFD 202 may note the predicted failure via a registry entry for each DSD, which can have an entry for its status indexed by each DSD's serial number. If failure is not predicted, then the DFD 202 may continue to monitor the health of the DSD if the current node 104 is the DSD's management owner.

The periodic health status-inquiring IOCTL request messages may return a health indicator to the operating system 214. The health indicator may indicate that the DSD to which the health status-inquiring IOCTL request message was directed is either healthy (i.e., no failure is predicted) or unhealthy (i.e., failure is predicted). The health indicator may indicate a failure is predicted when the current health state value exceeds the failure-indicating state value. The DFD 202 may intercept a first status of the health indicator that indicates a failure is predicted, and modify the first status to reflect a second status of the health indicator to indicate that no failure is predicted. The second status may be reported to the operating system 214. In this manner, the DFD 202 may mask from the operating system 214 the predicted failure of the DSD.

The DFD 202 of the management owner may also be responsible for determining whether to initiate remanufacturing operations if the DSD's health is degraded (i.e., failure is predicted), at 524. A service state value may also be determined based on the acquired DSD parameter(s). The service state value may represent a threshold value above which the DSD is determined to require remanufacturing (servicing). The current state value may be compared to the service state value. In one particular embodiment, remanufacturing may be initiated in response to the current health state value exceeding service state value.

If the DFD 202 determines that remanufacturing should be initiated on the DSD, then the DFD 202 may inform the DMS 210 of its intent to remanufacture the DSD, at 528. To communicate with the DMS 210, the DFD 202 may provide a device input and output control (IOCTL) interface 1008. In some embodiments, the IOCTL interface 1008 may allow the DMS 210 to send an IOCTL request message including a control code to the DFD 202. The control code may represent an operation for the DFD 202 to perform. For example, the DMS 210 may send a control code asking the DFD 202 to return information about the corresponding DSD.

In one particular embodiment, an IOCTL code used for communicating with the DFD 202 may take the form of IOCTL_[DFD_NAME]_MESSAGE, or a similar variation, such as IOCTL_DFD_MESSAGE. Each IOCTL code may be used to send information from the caller to the DFD 202 and to allow the DFD 202 to provide information, or notifications, to the caller.

Figure 11:
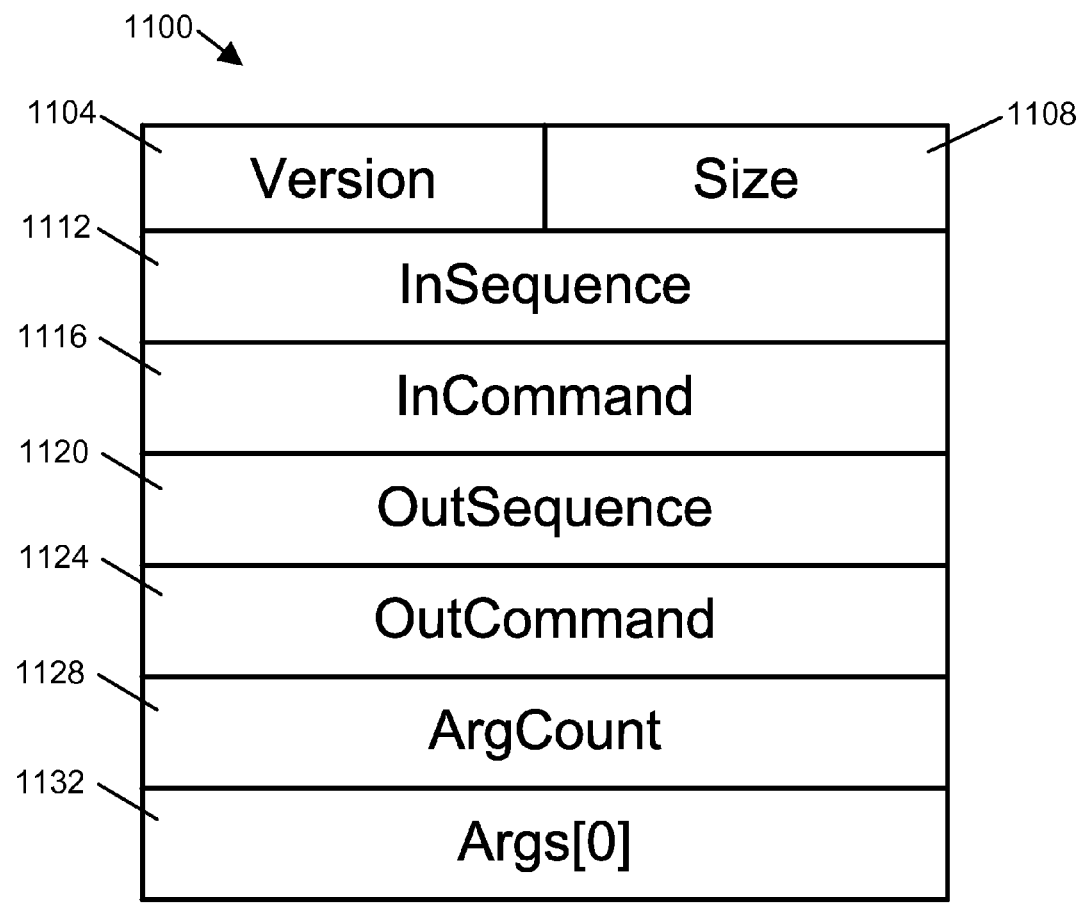
FIG. 11 shows a diagram of an illustrative embodiment of a format for an input and output control (IOCTL) message.

The IOCTL_DFD_MESSAGE control code may use the same message buffer for both input and output. FIG. 11 shows a diagram of an illustrative embodiment of a message 1100. The message 1100 may include fields providing information regarding the version 1104 and the size 1108 of the message 1100. This may be done to allow DFD 202 not to have to create a message itself. The fields InCommand 1116 and OutCommand 1124 each may encode a command. Incommand 1116 may be the command being sent from user-mode to the DFD 202. OutCommand 1124 may be the command being sent from the DFD 202 to the user-mode requestor. Each command may have an associated sequence number 1112, 1120, which may be used by the requestor to match a command with an associated response. The DMS 210 may set the InSequence 1112, and the DFD 202 may preserve the InSequence 1112 set by the DMS 210. The DFD 202 may set the OutSequence 1120.

In some embodiments, the IOCTL_DFD_MESSAGE control code may be designed to work as part of an "inverted call" system between the DMS 210 and the DFD 202. The DMS 210 may initially send an IOCTL_DFD_MESSAGE to the DFD 202 with an InCommand 1116 field set to a command indicating "No Operation" (e.g., [DFD NAME]_COMMAND_NOP) or the like. The DFD 202 may hold the "No Operation" command until either: (1) the DFD 202 receives a new IOCTL_DFD_MESSAGE, or (2) the DFD 202 wishes to provide information to the DMS 210.

In the event the DFD 202 receives a new IOCTL_DFD_MESSAGE, the DFD 202 may set the OutCommand field 1124 to DFD_COMMAND_NOP and set the Argument field 1132 to a parameter indicating a success of the command (e.g., STATUS_SUCCESS).

In the event the DFD 202 wishes to provide a notification to the DMS 210, the DFD 202 may set the OutCommand field 1124 to the corresponding command indicating the subject matter of the notification. For example, the DFD 202 may wish to inform the DMS 210 that a DSD owned by the current node 104 is scheduled to begin remanufacturing. The DFD 202 may fill the OutCommand field 1124 with DFD_COMMAND_REMANUFACTURE, set the OutSequence field 1120 to a unique value, and set the Argument field 1132 to a parameter indicating success of the command (e.g., STATUS_SUCCESS).

Referring back to FIGS. 3-6, the device function driver (DFD) 202 may inform the device management service (DMS) 210 of the DFD's 202 intent to initiate remanufacturing of the data storage device (DSD). The DFD 202 may wait for confirmation from the DMS 210 that remanufacturing may begin, at 532. The DMS 210 of the first node 104 may communicate to the DMS 210 of the second node 108 the intent to initiate remanufacturing so that that the second node 108 may take measures to ensure that the DSD may be remanufactured while remaining physically connected to the nodes 104, 108.

Upon receiving confirmation from the DMS 210 that the DFD 202 may proceed to initiate remanufacturing, the DFD 202 may note in the registry that the first node 104 is the owner of the DSD undergoing remanufacturing, at 536. This registry information may be used in the event a reboot occurs while remanufacturing is in progress. To inform the device virtualization bus driver (DVBD) 206 that a DSD is pending the initiation of remanufacturing, the DFD 202 may disable the device interface 1004, at 540. In response to the device interface 1004 being disabled, the DVBD 206 may delete the associated PDO 320, thereby logically removing the associated virtual DSD 324 from the node 104. The DFD 202 may then initiate remanufacturing on the DSD, at 544.

In some embodiments, the DFD 202 may monitor the progress of the DSD during the remanufacturing process, at 548. When remanufacturing is complete, the DFD 202 may remove the entry it previously created in the registry, at 552.

The DFD 202 may inform the DMS 210 that the DSD has completed remanufacturing and/or is available for use, at 556. Further, the DFD 202 may enable the device interface 1004, triggering the DVBD 206 to logically re-introduce the associated virtual DSD 324 to the node 104.

Returning to step 508, in the event the DFD 202 determines that the current node 104 is not the management owner of the DSD, the DFD 202 may determine whether a DSD owned by any other node is expected to start remanufacturing, at 564. The DFD 202 may make this determination based on communication with the DMS 210 via the device input and output control (IOCTL) interface 1008. The DMS 210 may be in communication with other nodes' respective DMS 210 via a status interface 1034.

If any other node is expected to start remanufacturing, the DFD 202 may disable the device interface 1004, at 568. In response to the device interface 1004 being disabled, the DVBD 206 may delete the associated PDO 320, thereby logically removing the associated virtual DSD 324 from the current node 104.

The DFD 202 may wait for the DMS 210 to confirm that remanufacturing of a DSD owned by another node has ended, at 572. Upon being informed of completion of remanufacturing, the DFD 202 may enable the device interface 1004, triggering the DVBD 206 to logically re-introduce the associated virtual DSD 324 to the node 104.

Figure 7:
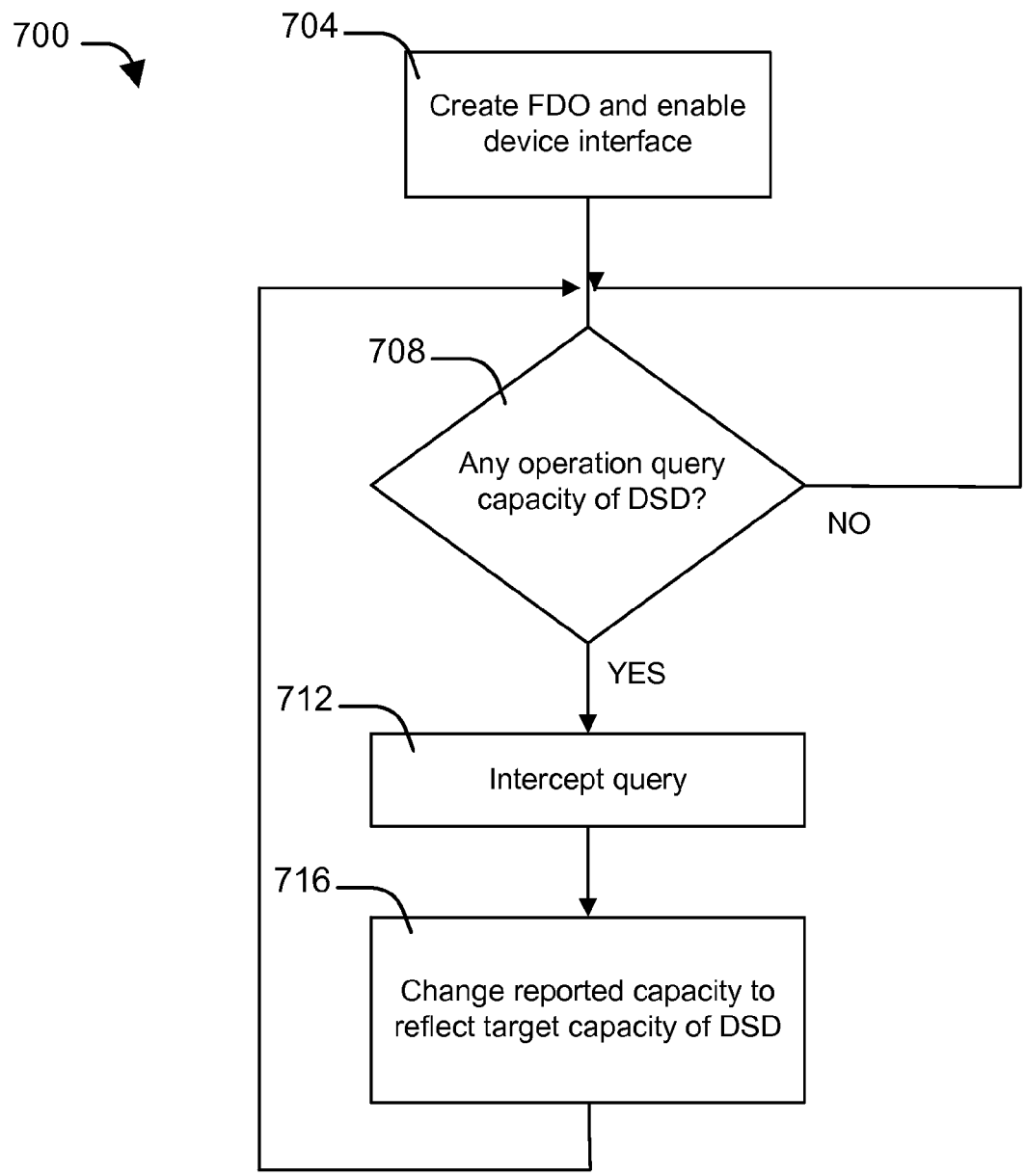
FIG. 7 shows a flowchart of another illustrative embodiment of a method for managed reliability of data storage.

FIG. 7 shows a flowchart of an illustrative embodiment of a method 700 for managed reliability of data storage. The flowchart represents steps performed by a loaded device function driver (DFD) 202 in accordance with some embodiments.

In some embodiments, one or more of the data storage devices (DSDs) 116 may be physically connected to a node 104 via an interface 120. A storage port miniport driver (not shown) and/or a storage port driver (not shown) may enumerate the DSD with a certain manufacturer's hardware ID via an operating system 214 hardware discovery, or Plug and Play, process. The DFD 202 may be loaded via the operating system 214 hardware discovery process in response to a storage port miniport driver and/or a storage port driver enumerating a DSD and in response to the port driver creating a physical device object (PDO) (not shown) representing the physical DSD.

The DFD 202 may create a functional device object (FDO) 314 for each port-reported PDO having a certain hardware ID, at 704. Further at step 704, the DFD 202 may register and enable a device interface 1004 for each FDO 314 that it creates.

The DFD 202 may also provide a standard upper-edge device input and output control (IOCTL) interface 1004. The upper-edge IOCTL interface 1004 may be used to receive IOCTL operations from an OS 214 destined to a DSD. The DVBD 206 may use this interface 1004 to forward to the DFD 202 I/O operations from the operating system's 214 corresponding device class driver(s). In turn, the DFD 202 may provide a lower-edge IOCTL interface 1204 to forward to the underlying PDO I/O operations it receives from the DVBD 206.

In some embodiments, the DFD 202 may, for each DSD, determine whether an operation is querying the capacity of the DSD, at 708. If so, the DFD 202 may intercept the query, at 712, and change the DSD's reported storage capacity to reflect the target storage capacity of the DSD, at 716. For example, the DSD may initially have a storage capacity of 100 GB, but, with the implementation of trivial overprovisioning of 25%, the target storage capacity may be 75 GB. Remanufacturing of the DSD may decrease the DSD's storage capacity, and therefore a remanufactured DSD may have an actual capacity less than 100 GB, but not necessarily 75 GB. Regardless of the current actual capacity of the DSD, the DFD 202 may intercept and return queries for the storage capacity of the DSD with 75 GB, the target capacity in this illustrative example.

Figure 8:
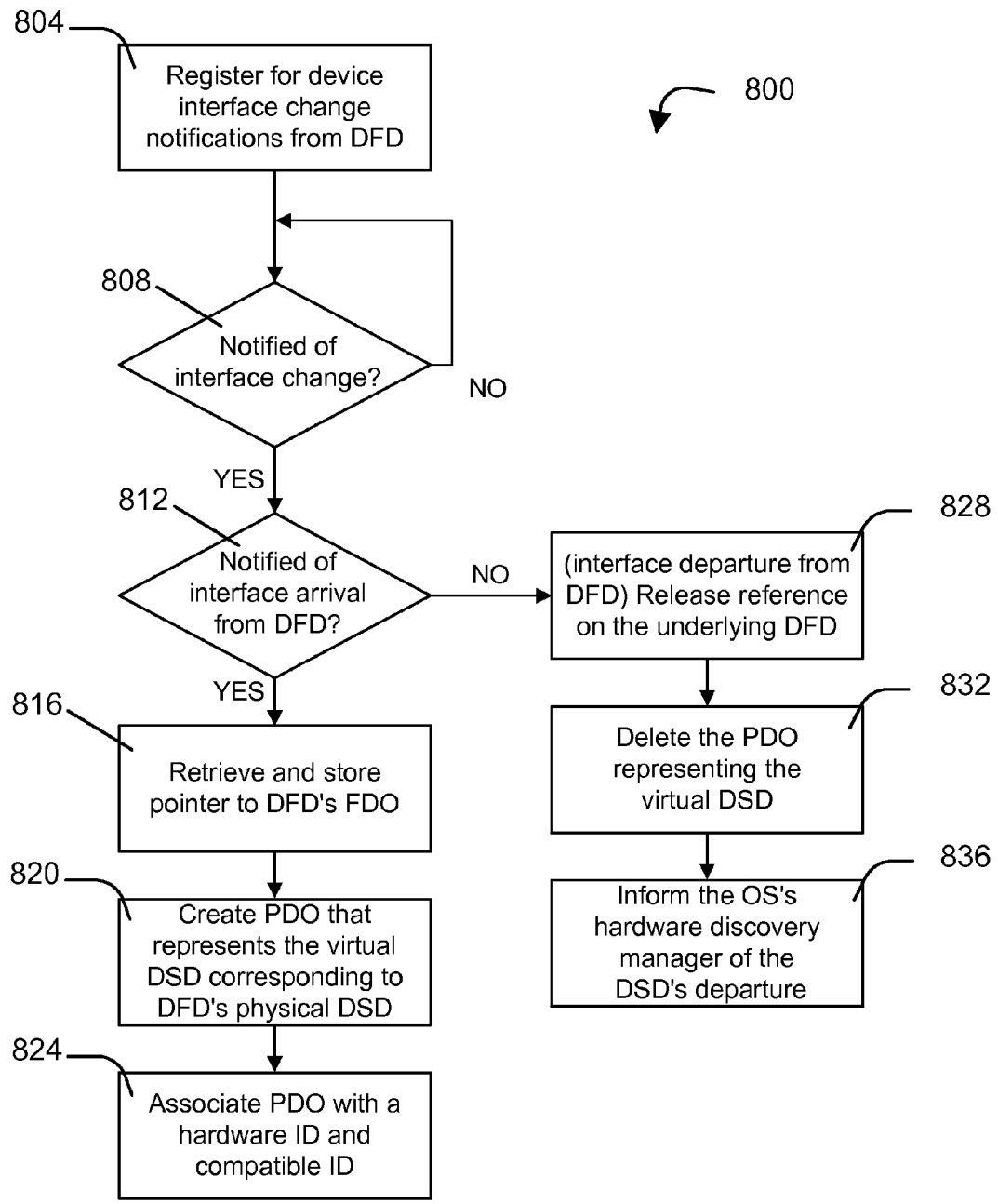
FIG. 8 shows a flowchart of another illustrative embodiment of a method for managed reliability of data storage.

FIG. 8 is a flowchart of an illustrative embodiment of a method 800 for managed reliability of data storage. The flowchart represents steps performed by a loaded device virtualization bus driver (DVBD) 206 in accordance with some embodiments.

The DVBD 206 may be a root-enumerated bus driver that instantiates physical device objects (PDOs) 320, each of which may represent a single virtual DSD 324. During initialization the DVBD 206 may register for device interface 1004 change notifications from the device function driver (DFD) 202, at 804.

If the DVBD 206 is notified of a device interface 1004 change, at 808, the DVBD 206 may determine whether the device interface 1004 change indicates a device interface 1004 arrival (i.e., the device interface 1004 is enabled) or a device interface 1004 departure (i.e., the device interface 1004 is disabled), at 812. If notified of a device interface 1004 arrival, then the DVBD 206 may retrieve and store a reference pointing to the functional device object (FDO) 314 corresponding to the enabled device interface 1004, at 816. The DVBD 206 may further create a PDO 320 that represents a virtual data storage device (virtual DSD) 324, at 820. The virtual DSD 324 may correspond to the physical data storage device (DSD) on which the FDO 314 was created. The DVBD 206 may associate the PDO 320 with a hardware ID and a compatible ID, at 824.

If the DVBD 206 is notified of a device interface 1004 departure, then the DVBD 206 may release the reference pointing to the FDO 314, at 828. The DVBD 206 may further delete the PDO 320 representing the virtual DSD 324, at 832, and inform the operating system's 214 hardware discovery manager of the DSD's departure, at 836.

Figure 9:
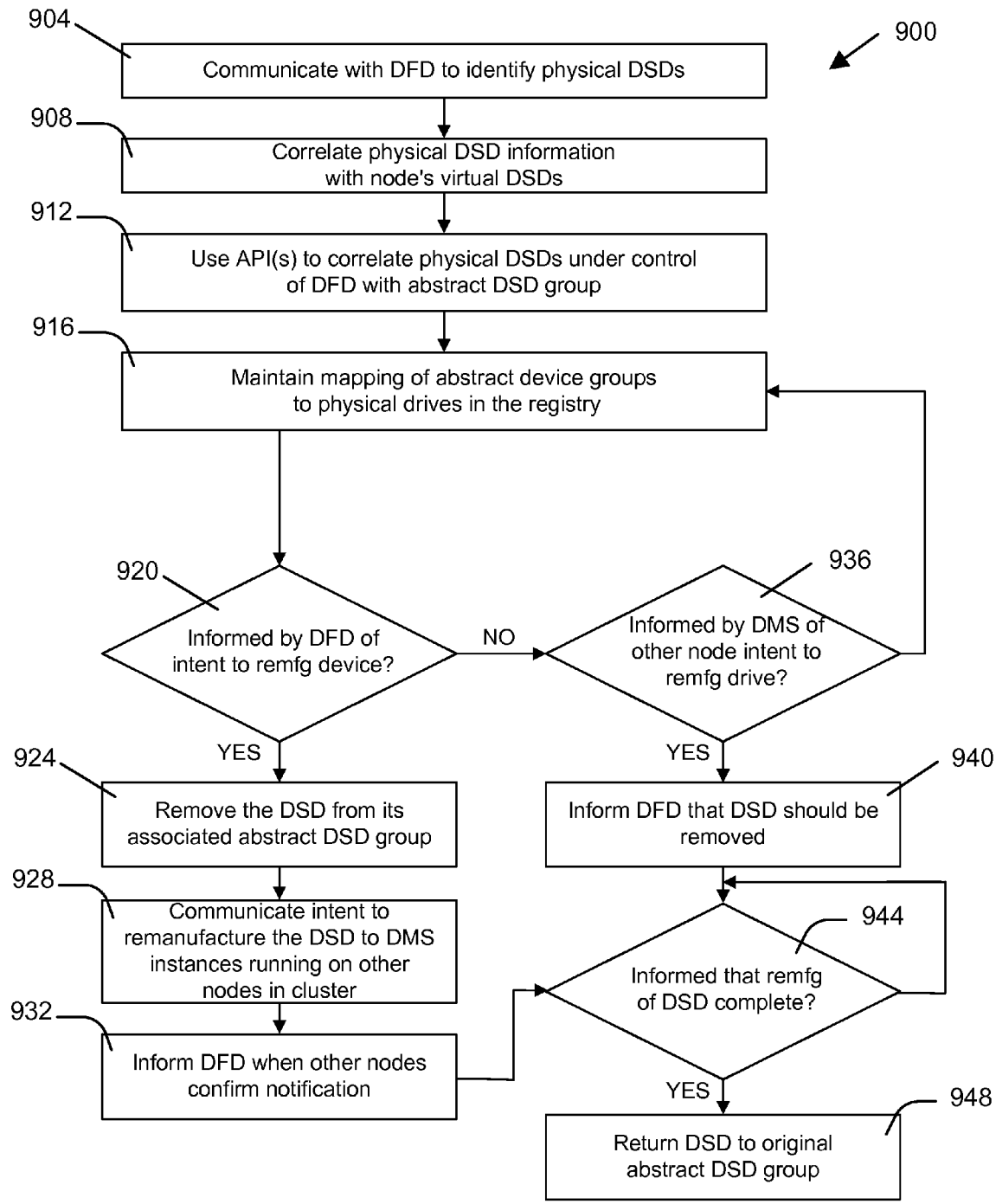
FIG. 9 shows a flowchart of another illustrative embodiment of a method for managed reliability of data storage.

FIG. 9 is a flowchart of an illustrative embodiment of a method 900 for managed reliability of data storage. The flowchart represents steps performed by a loaded device management service (DMS) 210 in accordance with some embodiments. The DMS 210 may be a user-mode service that is initiated during a node's 104 boot process.

Referring also to FIG. 10, the DMS 210 may publish an information interface 1036 and communicate with the DFD 202 via input and output control (IOCTL) messages to gather information about the node's 104 DSD configuration, and discover and report the initiation of DSD remanufacturing.

In some embodiments, the DMS 210 may communicate with the DFD 202 to identify the physical DSDs 116 connected to the node 104, at step 904. The DMS 210 may correlate the identified DSDs 116 with the node's 104 virtual DSDs 324, at 908. Further, the DMS 210 may use one or more application programming interfaces (APIs) to obtain DSD resource pool 332 and/or abstract DSD group 336 information. For example, the DMS 210 may use the operating system's 214 failover cluster APIs and the operating system's 214 abstract DSD group 332 APIs to obtain the DSD resource pool 332 and/or the abstract DSD group 336 information. The DMS 210 may also correlate the physical DSDs 116 with the obtained DSD resource pool 332 and/or abstract DSD group 336 information, at 912.

The method 900 may further involve the DMS 210 maintaining in the registry a mapping of abstract DSD groups 336 to virtual DSDs 324 and/or physical DSDs 116, at 916. The mapping may be used to re-establish the membership of the abstract DSD group(s) 336 if the node 104 is rebooted during remanufacturing of a DSD. The mapping information may be made available to other local applications via an interface provided by a service contract, such as, for example, a Windows Communication Foundation (WCF) service contract.

The DMS 210 may be informed by DFD 202 of the intent to remanufacture a DSD, at 920. When so informed, the DMS 210 may remove the DSD from its associated abstract DSD group(s) 336, at 924. The DMS 210 may further communicate the intent to remanufacture the DSD to the DMS 210 instance(s) running on one or more other nodes in the cluster (not shown), if any, at 928. The DMS 210 instance(s) running on one or more other nodes may confirm receipt of the notification of intent to remanufacture the DSD. Upon receiving this confirmation from the one or more other nodes, the DMS 210 may notify the DFD 202 of the confirmation, at 932.

The DMS 210 may be informed of the intent to remanufacture a DSD by a DMS 210 instance running on another node in the cluster (not shown), at 936. When so informed, the DMS 210 may inform the DFD 202 that the DSD should be logically removed, at 940. The DFD 202 may subsequently disable the device interface 1004 for the DSD, causing the DVBD 206 to delete the virtual DSD 324 corresponding to the physical DSD.

When informed, by either the DFD 202 or a DMS 210 instance running on another node in the cluster, that remanufacturing of a DSD is complete, the DMS 210 of the current node 104 may virtually re-introduce the DSD to its appropriate abstract DSD group 336.

The method steps described above with reference to each of FIGS. 4-9 are presented in a specific order. However, it should be apparent to one of skill in the art that additional steps may be included, or that some steps may be excluded or performed in a different order than that depicted in each of FIGS. 4-9.

In accordance with various embodiments, the methods described herein may be implemented as one or more software programs or modules running on a computer processor or controller. In accordance with other embodiments, the methods described herein may be implemented as one or more software programs running on a computing device, such as a personal computer or server that is using one or more data storage devices, such as a disc drive. Dedicated hardware implementations including, but not limited to, application specific integrated circuits, programmable logic arrays, and other hardware devices can likewise be constructed to implement the methods described herein. Further, the methods and systems described herein may be implemented as a computer readable storage medium, such as a storage device or memory, including instructions that when executed by a processor, cause the processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a processor configured to:
report to a host that a data storage device has been disconnected from the host when a virtual device is logically removed from the host based on a decision to remanufacture the data storage device, where the data storage device corresponds with the virtual device, and the data storage device remains physically connected to the host.

2. The apparatus of claim 1, further comprising the processor configured to register for device interface change notifications from a function driver, the function driver providing one or more functional device objects, each functional device object associated with a first physical device object, the first physical device object representing the data storage device, and the host is configured to communicate with the data storage device.

3. The apparatus of claim 2, further comprising the processor configured to receive a device interface change notification indicating that the function driver enabled a device interface or disabled a device interface, the device interface providing access to the functional device object.

4. The apparatus of claim 3, further comprising the processor configured to create the virtual device when a device interface change notification is received that indicates that the function driver enabled a device interface, comprising:
creating a second physical device object, the second physical device object representing the virtual device;
storing a reference pointing to the functional device object for which the device interface was enabled; and
associating the second physical device object with a hardware identification.

5. The apparatus of claim 4, further comprising the processor configured to remove the virtual device when a device interface change notification is received that indicates that the function driver disabled a device interface, comprising:
releasing the reference pointing to the function driver; and
deleting the second physical device object.

6. A memory device storing instructions that when executed by a processor cause the processor to perform a method comprising:
determining when a virtual data storage device is logically removed from a host, where the virtual data storage device is logically removed from the host based on a decision to remanufacture a physical data storage device;
reporting to the host that the physical data storage device has been disconnected from the host;
the physical data storage device corresponding to the virtual data storage device; and
the physical data storage device remaining physically connected to the host.

7. The memory device of claim 6, wherein the method further comprises registering for device interface change notifications from a function driver.

8. The memory device of claim 7, further comprising the function driver providing one or more functional device objects, each functional device object associated with a first physical device object, the first physical device object representing the physical data storage device, the host configured to communicate with the physical data storage device.

9. The memory device of claim 8, wherein the method further comprises receiving a device interface change notification indicating that the function driver enabled a device interface or disabled a device interface, the device interface providing access to the functional device object.

10. The memory device of claim 9, wherein the method further comprises creating the virtual data storage device when a device interface change notification is received that indicates that the function driver enabled a device interface.

11. The memory device of claim 10, wherein creating the virtual data storage device further comprises associating a second physical device object with a hardware identification.

12. The memory device of claim 10, wherein creating the virtual data storage device further comprises:
creating a second physical device object, the second physical device object representing the virtual data storage device; and
storing a reference pointing to the functional device object for which the device interface was enabled.

13. The memory device of claim 12, wherein the method further comprises removing the virtual data storage device when a device interface change notification is received that indicates that the function driver disabled a device interface, including:
releasing the reference pointing to the function driver; and
deleting the second physical device object.

14. A method comprising:
determining when a virtual device is to be logically removed from a host based on a decision to remanufacture a physical device;
reporting to the host that the physical device has been disconnected from the host based on the determining, the physical device corresponding to the virtual device and the physical device remaining physically connected to the host.

15. The method of claim 14, wherein the physical device comprises a data storage device.

16. The method of claim 14, further comprising registering for device interface change notifications from a function driver, the function driver providing one or more functional device objects, each functional device object associated with a first physical device object, the first physical device object representing the physical device, the host configured to communicate with the physical device.

17. The method of claim 14, further comprising receiving a device interface change notification indicating that a function driver enabled a device interface or disabled a device interface, the device interface providing access to the functional device object.

18. The method of claim 14, further comprising creating the virtual device when a device interface change notification is received that indicates that a function driver enabled a device interface, including:
- creating a physical device object, the physical device object representing the virtual device;
- storing a reference pointing to a functional device object for which the device interface was enabled;
- and associating the physical device object with at least one of a hardware ID and a compatible ID.

19. The method of claim 14, further comprising removing the virtual device when a device interface change notification is received that indicates that a function driver disabled a device interface, including:
- releasing a reference pointing to the function driver; and
- deleting a physical device object.

* * * * *